United States Patent
Kim

(10) Patent No.: US 6,590,597 B1
(45) Date of Patent: Jul. 8, 2003

(54) SCREEN LOCKING FEATURE OF A COMPUTER SYSTEM USING A UNIVERSAL SERIAL BUS (USB) HUB

(75) Inventor: Jin-Hoon Kim, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/114,300

(22) Filed: Jul. 13, 1998

(30) Foreign Application Priority Data

Jul. 12, 1997 (KR) .............................. 97-32391

(51) Int. Cl.$^7$ .............................. G06F 1/26; G06F 3/00; G09G 5/00
(52) U.S. Cl. .................. 345/905; 345/211; 345/764; 345/867; 710/19; 713/310; 713/323; 713/324
(58) Field of Search .................... 348/5.5; 713/323, 713/300, 200, 310, 320, 324, 330, 340; 395/750.05; 345/764, 805, 867, 905, 211; 710/14, 18, 19

(56) References Cited

U.S. PATENT DOCUMENTS

| | | | | |
|---|---|---|---|---|
| 5,355,490 A | * | 10/1994 | Kou | 395/700 |
| 5,612,520 A | * | 3/1997 | Toedtman et al. | 200/16 D |
| 5,640,176 A | * | 6/1997 | Mundt et al. | 345/146 |
| 5,719,618 A | * | 2/1998 | Park | 348/5.5 |
| 5,752,048 A | * | 5/1998 | Antol et al. | 395/750.05 |
| 5,758,172 A | * | 5/1998 | Seo | 395/750.01 |
| 5,822,599 A | * | 10/1998 | Kidder et al. | 345/212 |
| 5,832,285 A | * | 11/1998 | Shimada | 395/750.05 |
| 5,935,244 A | * | 8/1999 | Swamy et al. | 713/200 |
| 5,938,772 A | * | 8/1999 | Welch | 713/320 |
| 5,978,923 A | * | 11/1999 | Kou | 713/323 |
| 5,987,613 A | * | 11/1999 | Busch et al. | 713/300 |
| 6,006,335 A | * | 12/1999 | Choi et al. | 713/310 |
| 6,076,133 A | * | 6/2000 | Brainard et al. | 713/300 |
| 6,205,318 B1 | * | 3/2001 | Schindler et al. | 345/212 |
| 6,289,466 B1 | * | 9/2001 | Bayramoglu et al. | 713/310 |

* cited by examiner

Primary Examiner—Bipin Shalwala
Assistant Examiner—David L. Lewis
(74) Attorney, Agent, or Firm—Robert E. Bushnell, Esq.

(57) ABSTRACT

A computer system using a universal serial bus (USB) hub is provided with a screen locking function. The computer system includes a computer main unit, information input devices electrically connected to the computer main unit for permitting a user to input information to the computer main unit for data processing operation, a display device electrically connected to the computer main unit for providing a visual display of information processed by the computer main unit, and a universal serial bus (USB) hub arranged to electrically connect the information input devices and the display device to the computer main unit and through which, the screen locking apparatus is set to disable operation of the information input devices such as a keyboard and mouse. This way when the user temporarily leave the computer system, a currently executed program is protected from interference and damage.

16 Claims, 6 Drawing Sheets

SCREEN LOCKING FEATURE OF A COMPUTER SYSTEM USING A UNIVERSAL SERIAL BUS (USB) HUB

CLAIM FOR PRIORITY

This application makes reference to, incorporates the same herein, and claims all benefits accruing under 35 U.S.C. §119 from an application for LOCKING APPARATUS OF COMPUTER SYSTEM USING USB HUB earlier filed in the Korean Industrial Property Office on the 12$^{th}$ of July 1997, and there duly assigned Serial No. P97-32391 by that Office, a copy of which application is annexed hereto.

BACKGROUND OF THE INVENTION

1. Technical Field

The present invention relates to a computer system using an universal serial bus (USB) hub and, more particularly, to a display monitor of a computer system having a screen locking switch for controlling information signal from an information input device such as a keyboard and a mouse, and for preventing computer programs from unwarranted interference.

2. Related Art

A general computer system includes a computer main unit (which may have built-in storage devices such as floppy disks, hard disks and CD-ROM), a keyboard and a monitor connected to the main computer unit. Other computer peripheral devices such as an input mouse, a printer, a scanner, a telephone, and an external modem may also be connected to the main computer unit. These peripheral devices are generally supplied with power when the computer main unit is provided with power, or supplied with power by operation of a separate power ON/OFF switch. When power is supplied, each peripheral device must be initialized and pre-heated before use. The power supply is consumed by the peripheral device until manual power termination regardless whether the peripheral device is in use or not.

CRT monitor which is widely used as a display device of the computer system processes information signal received from the computer system via a signal transmission cable and provides a visual display of the processed information signal on a screen. When there is no signal from the computer system, the monitor remains idle. For purposes of conserving power, the display of data image on the monitor may be blanked during the period of inactivity and re-displayed when the computer system becomes active, i.e., when an input device such as a keyboard is operated. In addition, a screen saver function may be provided by software to store current image data in a separate memory and provides a visual display of a screen saving image during the period of inactivity. However, the screen saving function is automatic and is carried out after a predetermined time of inactivity. The user cannot lock the screen at a specific time that s/he desires. As a result, error may be generated in the program due to continuous keyboard operation by other users.

SUMMARY OF THE INVENTION

Accordingly, it is therefore an object of the present invention to provide a computer system having a screen locking function for locking a screen precisely at a desired time in order to prevent programs from unwarranted interference.

It is also an object to provide a computer system with a screen locking switch conveniently located on a display monitor for permitting a user to lock a screen of the display monitor and disable operation of input devices such as a keyboard and mouse.

It is further an object to provide a computer system using a universal serial bus (USB) hub for power and data distribution to different peripheral devices with a screen locking switch located on a display monitor for controlling operation of input devices such as a keyboard and mouse.

It is yet an object to provide a computer system providing an on-screen visual display of a screen locking function to inform a user of the status of computer operation.

These and other objects of the present invention can be achieved by a computer system provided with a screen locking function which comprises a computer main unit; information input is devices electrically connected to said computer main unit for permitting a user to input information to the computer main unit for data processing operation; a display device for providing a visual display of information processed by the computer main unit; and a screen locking apparatus positioned on the display device, for permitting the user to manually disable operation of the information input devices temporarily.

In accordance with another aspect of the present invention, a computer system provided with a screen locking function may be constructed with a computer main unit, a universal serial bus hub electrical connected to the computer main unit serving as a central connection point for power and data distribution to information input devices and a display device; and a screen locking switch positioned on the display device, for permitting a user to manually lock a screen of the display device and disable operation of the information input devices via the universal serial bus (USB) hub.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
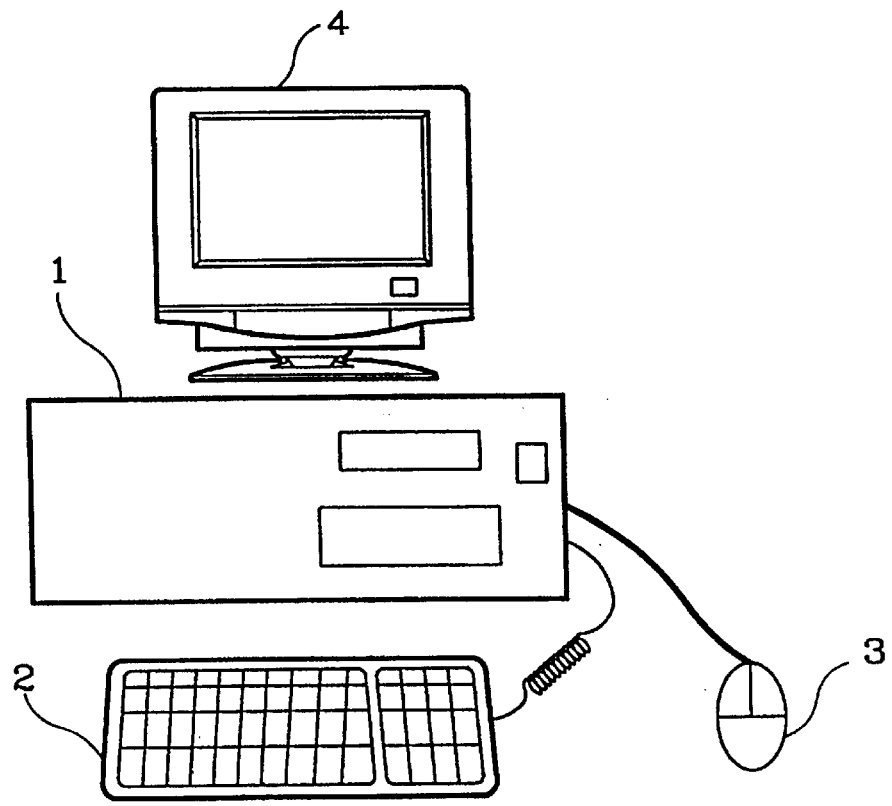
FIG. 1 is a block diagram of a typical computer system with a keyboard and a display monitor.

Referring now to the drawings and particularly to FIG. 1, which illustrates an exemplary computer system comprising a computer main unit 1 and peripheral devices such as a keyboard 2, a mouse, 3 and a display monitor 4 connected to the computer main unit 1. Each respective peripheral device has a port available via unoccupied one of slots on the mother board of the computer main unit 1. Typically, the user has to open the computer main unit 1 and insert an interface card in a corresponding slot on the mother board. On occasions the user must operate a switch, set a jumper or arrange the types of connectors such as serial or parallel appropriate for the peripheral devices. Each peripheral device is generally supplied with power when the computer main unit 1 is provided with power, or supplied with power by operation of a separate power ON/OFF switch. When power is supplied, each peripheral device must be initialized and pre-heated before use. The power supply is consumed by the peripheral device until manual power termination regardless whether the peripheral device is in use or not. For instance, a display monitor of either a cathode-ray tube or a liquid crystal display which is widely used to process information signal received from the computer system via a signal transmission cable and provide a visual display of the processed information signal on a screen, the display monitor generally remains idle, when there is no signal activity from the computer system. A screen blank function may be provided such that display of data image on the monitor is blanked during the period of inactivity and re-displayed when the computer system becomes active, i.e., when an input device such as a keyboard is operated. In addition, a screen saver function may be provided by software such that current image data is stored in a separate memory and a screen saving image is displayed on the screen during the period of inactivity. However, the screen saving function is automatic and is carried out after a predetermined time of inactivity. The user cannot lock the screen at a specific time that s/he desires. As a result, error may be generated in the program due to continuous keyboard operation by other users.

This type of error is augmented when the computer system uses a universal serial bus (USB) hub which serves as a central connection point of the computer system for power and data distribution to all peripheral devices in order to conveniently control power distribution over different peripheral devices. The universal serial bus (USB) hub is used to reduce the number of interface cards and slots available on the mother board of the main unit 1 of the computer system. The peripheral devices to be connected to the universal serial bus (USB) hub may include a telephone network, a modem, a printer, a microphone, a mouse, a scanner, a digital camera and so on. Simplicity and convenience are the major advantages of the USB hub. This is because the universal serial bus (USB) hub can sense the addition or removal of peripheral devices from the computer system without rebooting the system even when power is still activated, unlike the conventional built-in slots. In addition, the USB hub supports plug-and-play operations such that information relating to the source, e.g., driver software required for the respective peripheral devices or band width of the bus can be obtained automatically without intervention of the user.

Figure 2:
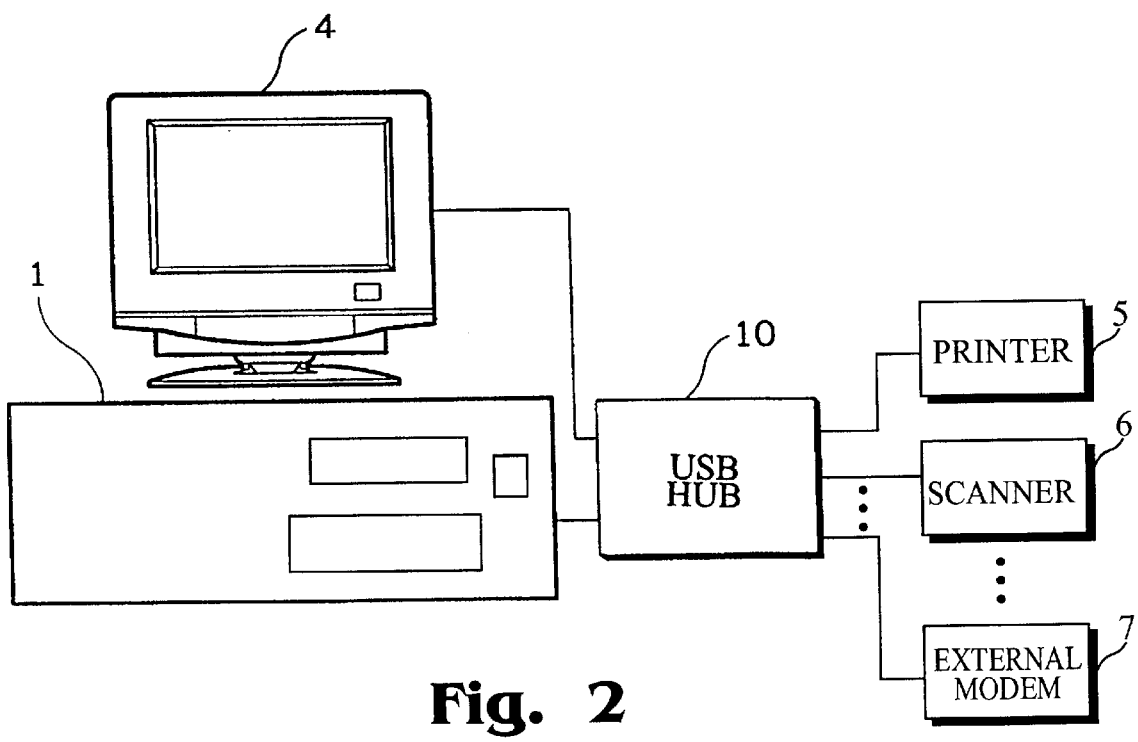
FIG. 2 is a block diagram of a computer system using a universal serial bus (USB) hub for power distribution to peripheral devices.

The use of a universal serial bus (USB) hub 10 is shown in FIG. 2 for connecting all peripheral devices such as a display monitor 4, a printer 5, a scanner 6 and an external modem 7 to the computer main unit 1 of the computer system. The keyboard 2 and display monitor 4 may be connected directly the computer main unit 1. The USB hub 10 allows the user to install all other peripheral devices or its related cards to the computer system without having to open the computer main unit 1 for interface cards installation. The USB hub 10 provides connections between the computer main unit 1 and up to 127 peripheral devices and supplies an operational voltage of only 5 volts to the respective peripheral devices without consuming a vast DC voltage. In addition, the USB hub 10 has a data transmission rate of 12 Mbit/sec sufficient that most peripheral devices of a large band width can have a tremendous capacity at a little expense relative to the cost for the current connector technique.

Figure 3:
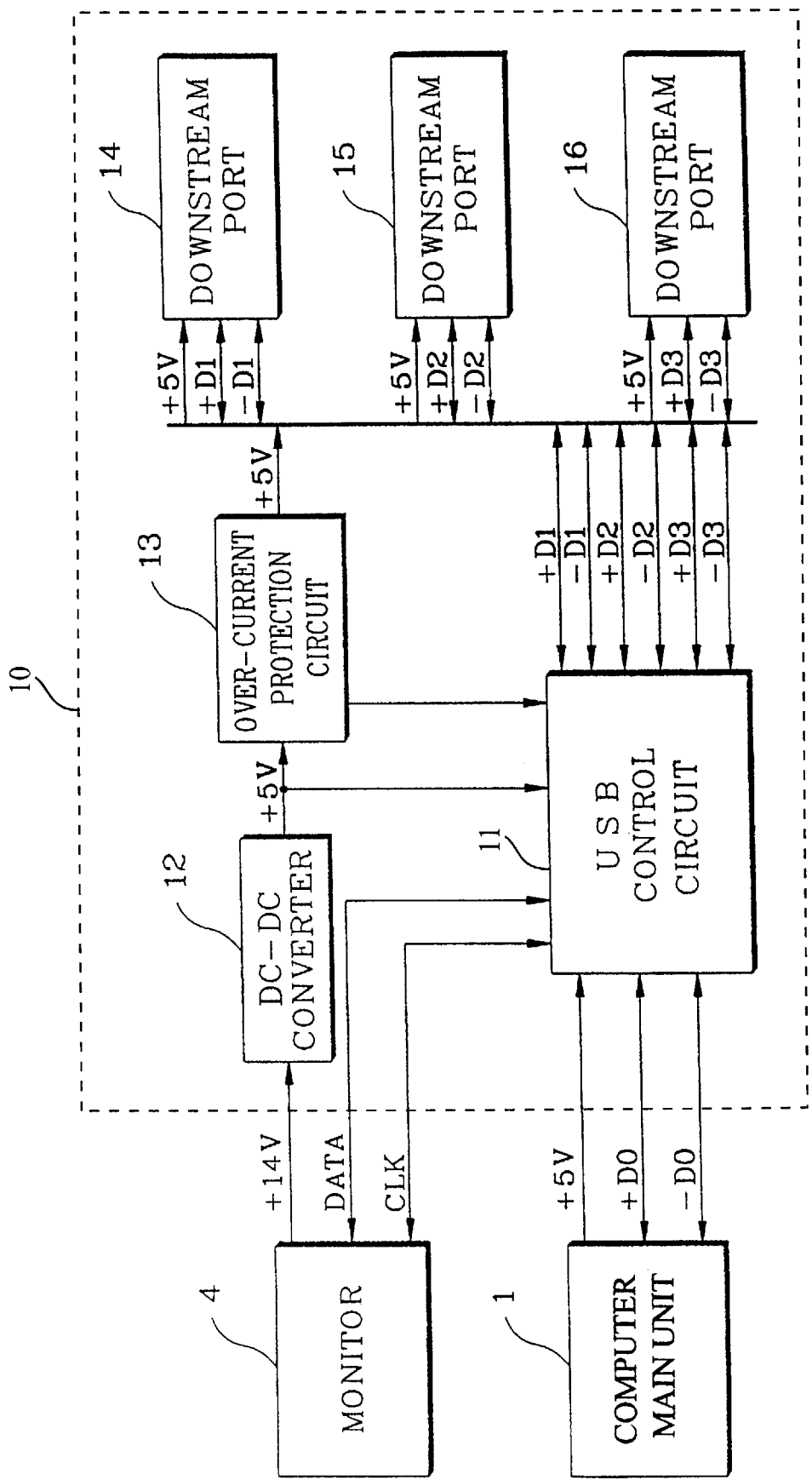
FIG. 3 is a detailed circuit diagram of the universal serial bus (USB) hub as shown in FIG. 2.

FIG. 3 illustrates a circuit diagram of the USB hub 10 for power distribution of a designated peripheral device such as a display monitor 4. The USB hub 10 includes a USB control circuit 11 for controlling information transmission between the computer main unit 1 and peripheral devices using data and clock provided by the display monitor 4, a DC-DC converter 12 for processing the power supplied from the display monitor 4 to provide operation power to USB control circuit 11 and down stream ports 14, 15 and 16 respectively connected to peripheral devices 5–7, and an over-current protection circuit 13 for detecting output current of DC-DC converter 12 to prevent damages due to over-current. The computer main unit 1 is constructed such that it supplies the USB control circuit 11 with an operational power of 5 volts and exchanges information and clocks mutually with the USB control circuit 11.

As shown in FIG. 3, the power (14V) supplied from the display monitor 4 passes through DC-DC converter 12, to be provided to USB control circuit 11 as its operation voltage (5V). The power (5V) from DC-DC converter 12 is supplied to USB control circuit 11 and to peripheral devices 5–7 through down stream ports 14, 15 and 16. The computer system is connected to up stream port of USB control circuit 11. In this case, USB environment is set in the computer, and the computer main computer 1 automatically supports the USB control environment. When the computer peripheral devices 5, 6 and 7 are connected to down stream ports 14, 15 and 16 of USB hub 10, the computer main unit 1 identifies the ID and, if acceptable, installs the peripheral devices 5–7 automatically without separate action of the user.

Display monitor 4 processes information signal received from the computer main unit 1 via a signal transmission cable and provides a visual display of the processed information signal on a screen. An internal circuit of the display monitor 4 is shown in FIG. 4.

Figure 4:
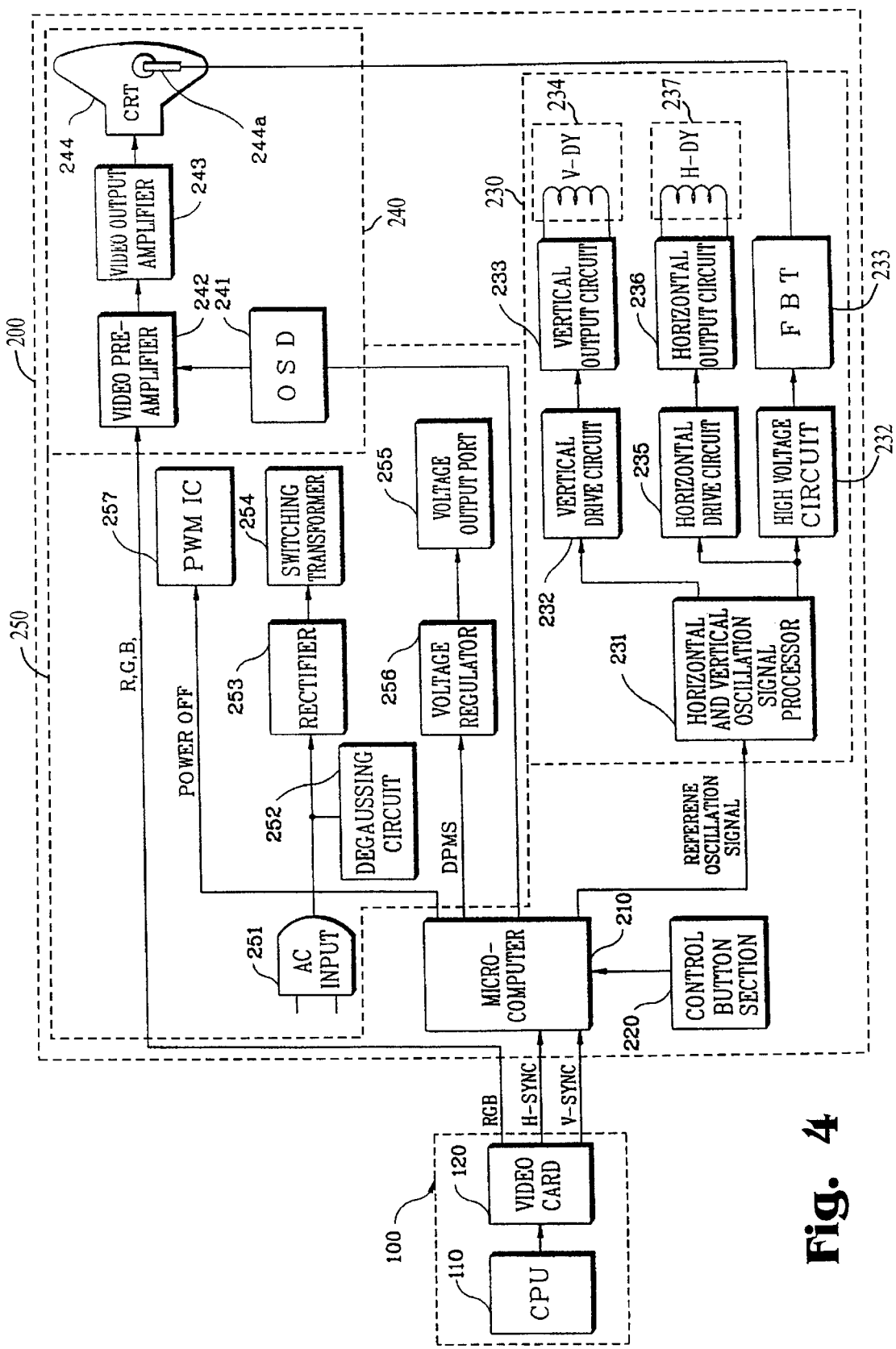
FIG. 4 is a detailed circuit diagram of a display monitor.

Referring to FIG. 4, the computer main unit 100 includes a central processing unit (CPU) 110 for receiving an input keyboard signal, processing the input signal, and generating image data, and a video card 120 for receiving the image data from CPU 110, processing the same as a video signal (R,G,B), and generating horizontal and vertical synchronous H-SYNC and V-SYNC signals for synchronizing the video signal. The video signal (R,G,B) and horizontal and vertical synchronous H-SYNC and V-SYNC signals are sent from video card 120 of the computer main unit 100 to the monitor 200 through a video signal cable (not shown).

Display monitor 200 receives the video signal and the horizontal and vertical synchronous H-SYNC and V-SYNC signals from the video card 120 of the computer main unit 100. The display monitor 200 is composed of a microcomputer 210 which receives the horizontal and vertical synchronous signals, a control button section 220 for generating a screen control signal, a horizontal and vertical output circuit 230 for formulating an image, a video circuit section 240 for processing the video signal received from the video card 120 through amplification, and a power supply circuit 250 for supplying a driving power to the microcomputer 210, the horizontal and vertical output circuit 230, and the video circuit section 240.

Microcomputer 210 which stores all sorts of screen control data is receptive to the horizontal and vertical synchronous H-SYNC and V-SYNC signals from the video card 120, and generates an image adjusting signal and a reference oscillating signal in response to the screen control signal applied from the control button section 220. A horizontal/vertical oscillation signal processor 231 receives the image adjusting signal and the reference oscillating signal from the microcomputer 210, and supplies a vertical pulse to a vertical drive circuit 232. The vertical pulse is used to control the switching rate, of a sawtooth wave generating circuit in response to the horizontal and vertical synchronous H-SYNC and V-SYNC signals.

The video drive circuit 232 can be either a one-stage vertical amplification type or an emitter follower type. The emitter follower type vertical drive circuit has the base of transistor used as an input with the emitter as an output. Hence the vertical drive circuit 232 normally has improved linear characteristic but not gain. The vertical drive circuit 232, after amplification, supplies a drive current to a vertical output circuit 233, which will apply a sawtooth current corresponding to a vertical synchronous V-SYNC pulse flowing through a V-DY, determining a vertical scanning period depending on the sawtooth current. In addition, a horizontal drive circuit 234 receives a horizontal oscillating signal from the horizontal and vertical oscillating processor 231, and accordingly, supplies a drive current high enough to switch the horizontal output circuit 235.

Upon receipt of the drive current from the horizontal drive circuit 234, the horizontal output circuit 235 will generate a sawtooth current to the H-DY, determining a horizontal scanning period depending on the sawtooth current. Such a horizontal drive circuit 234 is divided into two classes; in-phase type whose output is ON with the drive terminal ON, and out-of-phase type wherein the output is OFF with the drive terminal ON.

High-voltage circuit 236 and FBT (flyback Transformer) 237 generate a high voltage in order to supply a stable DC voltage to the anode terminal 244*a* of a cathode-ray tube (CRT) 244. Even when a collector pulse is very weak, high-voltage circuit 235 and FBT 237 can generate a high voltage by use of a harmonic wave due to inductance and distribution capacity. This high voltage is applied to the anode terminal 244*a* of the CRT 244, forming a high voltage across the anodic surface of the CRT 244. Simultaneously, the video circuit section 240 has an on-screen display (OSD) IC 241 which receives OSD data generated during the screen control of the microcomputer 210 to generate an OSD gain signal. This OSD gain signal from the OSD IC 241 is sent to a video pre-amplifier 242.

Upon receipt of the OSD gain signal from the OSD IC 241 and the RGB video signal from the video card 120, the video pre-amplifier 242 amplifies the RGB picture signals to a limited voltage level via a low-voltage amplifier. For example, a video signal less than 1 $V_{pp}$ is converted to the voltage of 4 to 6 $V_{pp}$ through an amplification in the video pre-amplifier 242. This video signal is further amplified to 40 and 60 $V_{pp}$ in a video output amplifier 243 and then sent to the cathode of the CRT 244 for a visual display of a variable video image. The image which has been produced through the CRT 244 in response to the RGB video signal and the OSD signal has its scanning period determined by the H-DY and V-DY and is visually displayed on the screen of CRT 244. The RGB video signal or the OSD signal which are amplified by the vide output amplifier 243 will be displayed as a variable video image with the luminance regulated by the high voltage formed across the anode surface of CRT 244.

Power supplying circuit section 250, which is to provide a driving voltage for displaying the RGB video signal on the screen of the display monitor, receives an AC (Alternative Current) through an AC input 251. The AC is applied to a degaussing coil 252, which resumes the color blotted due to the influence of the earth magnetic field or external environment to the original distinct one. For this, degaussing coil 252 disperses the magnetic field of a DC component formed across the shadow mask in CRT 244 while an AC is applied to the degaussing coil 252 momentarily for 2–8 seconds, and prevents the electron beams from being deflected unstably due to the magnetic field. The AC is normally rectified into a DC through a rectifier 251 and transmitted to a switching transformer 254. The switching transformer 254 supplies all sorts of driving voltage required in the monitor 200 via a voltage regulator 255. At this stage, PWM (Pulse Width Modulation) IC 256 controls the switching operation of the switching transformer 254, stabilizing the output voltage of the transformer.

Microcomputer 210 which is in a DPMS (Display Power Management Signaling) mode to economize power consumed in the display monitor 200, sets up a power-off mode and a suspend mode depending on the presence of horizontal and vertical synchronous H-SYNC and V-SYNC signals, and accordingly saves the power in the display monitor 200. If the user adjusts a screen or wants to have information about the display mode of the display monitor which is in a current use, s/he has to choose the OSD function through the control button section 220 as programmed in the microcomputer 210. Upon the user's pressing a button for the OSD function, the microcomputer 210 serves the OSD function in response to a key signal through the OSD IC 241. In this case, the microcomputer 210 sends OSD data already stored therein to the OSD IC 241, which processes the OSD data to generate an OSD gain signal to the video pre-amplifier 242 and the video output amplifier 243. The OSD gain signal is then displayed on the screen of the CRT 244 after amplification via those amplifiers 242 and 243. Under the OSD signal, the CRT 244 provides an on-screen display of menus relating to the OSD function. The user may choose one menu containing information of the display monitor 200, such as screen locking, screen adjustment, display mode, horizontal and vertical frequencies, and the like.

Figure 5:
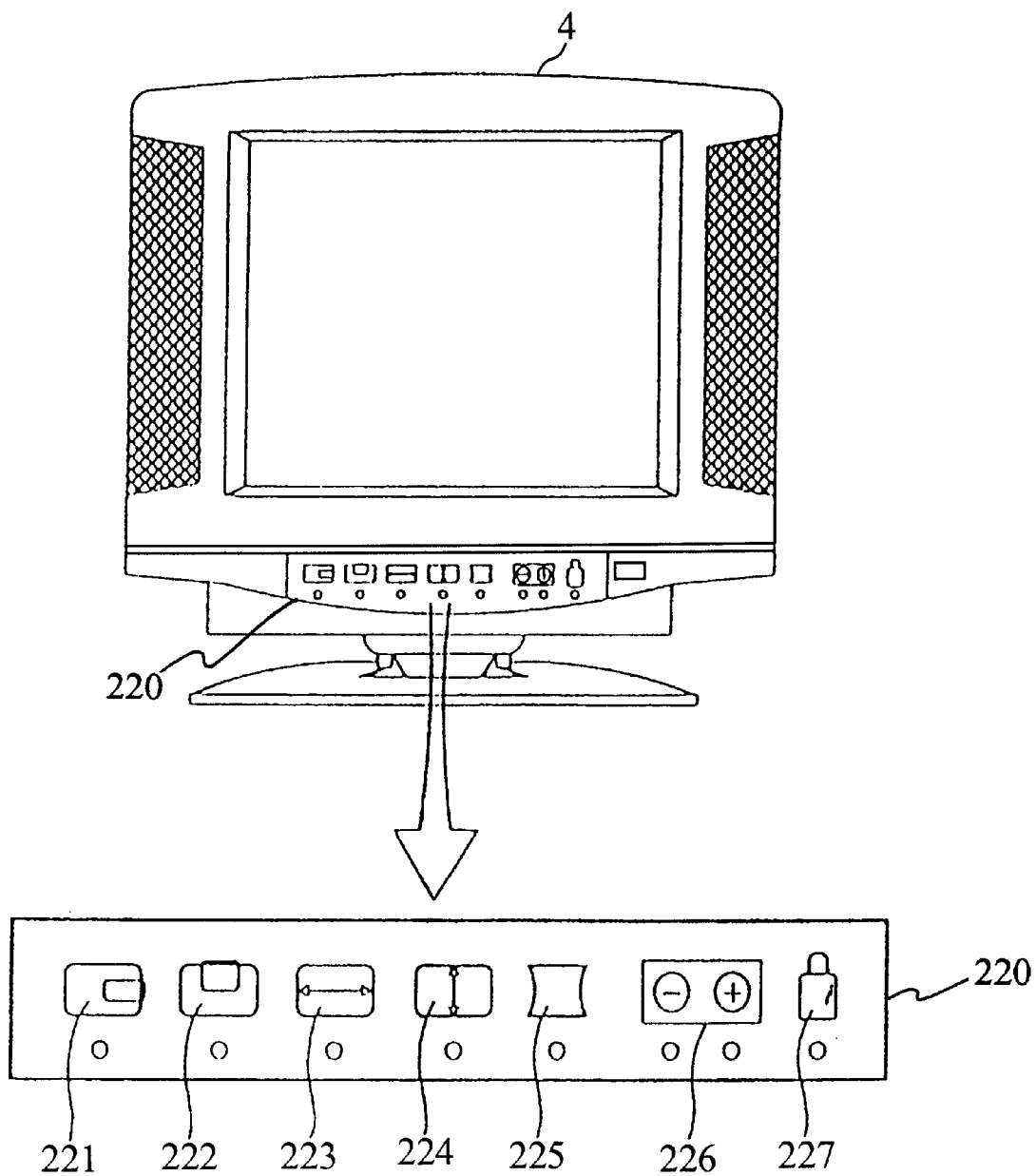
FIG. 5 is a schematic view of a control panel of a display monitor constructed according to the principles of the present invention as a preferred embodiment.

Control button section 220, as shown in FIG. 5, includes a variety of picture control buttons which are left/right position control key 221, top/bottom position control key 222, left/right size control key 223, top/bottom size control key 224 and side pincushion control key 225. While a certain control key is pushed, a minus control key and plus control key 226 are used to realize a picture in a required form. In addition those keys, the control button section of the display monitor according to the present invention also includes a screen locking switch 227 which operates in a toggle manner and maintains its setting state by repeating ON/OFF states. The screen locking switch 227 is configured to permit the user to manually lock the screen of the display monitor anytime, anywhere at any situation without having to wait for the screen saving function or the like in order to protect the programs which is currently executed, from potential interference or damage.

Figure 6:
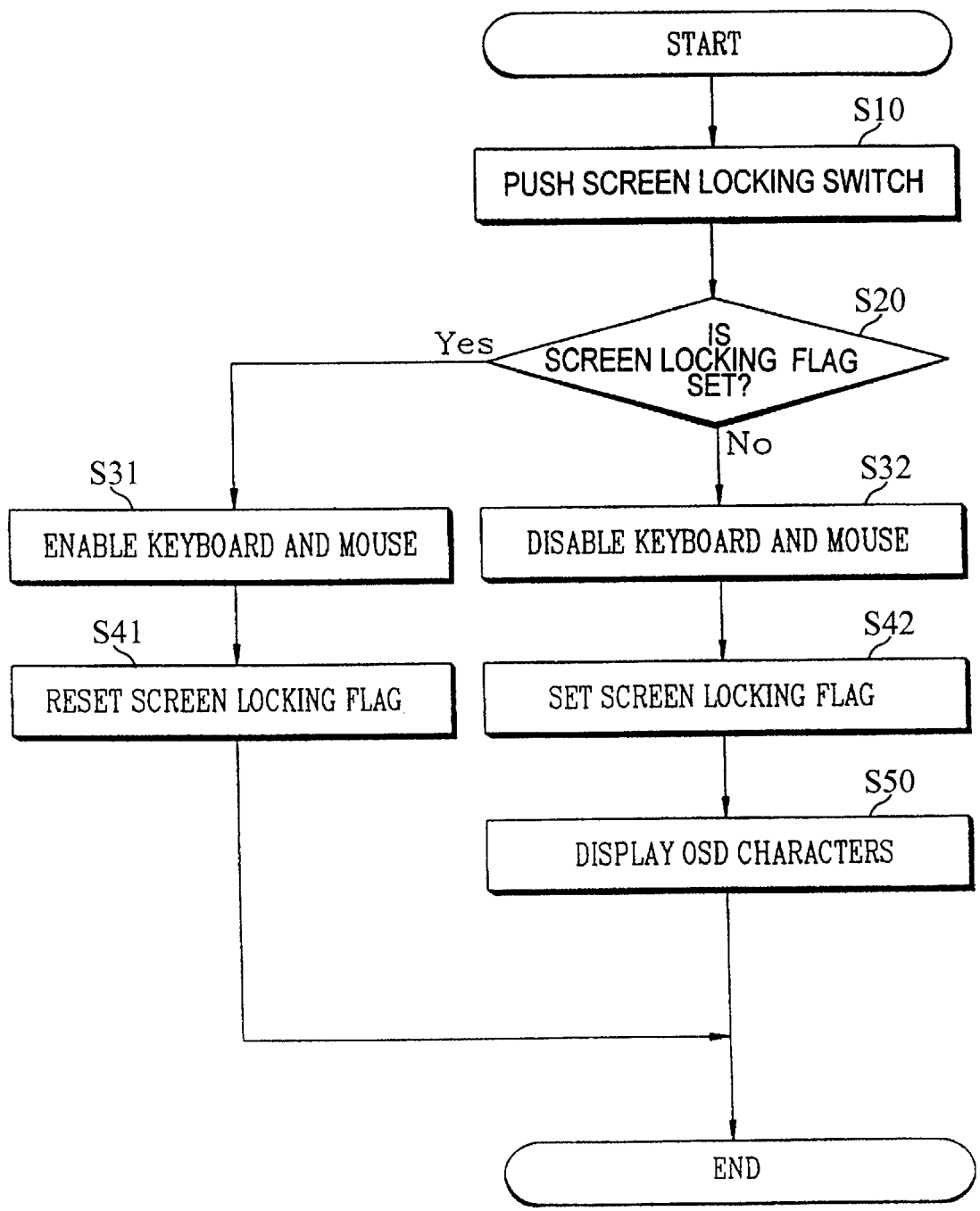
FIG. 6 is a flowchart of a screen locking process according to the principles of the present invention.

Now the operation of screen locking function provided by the screen locking switch 229 will be described in detail with reference to FIGS. 1, 4 and 6 as follows.

Figure 7:
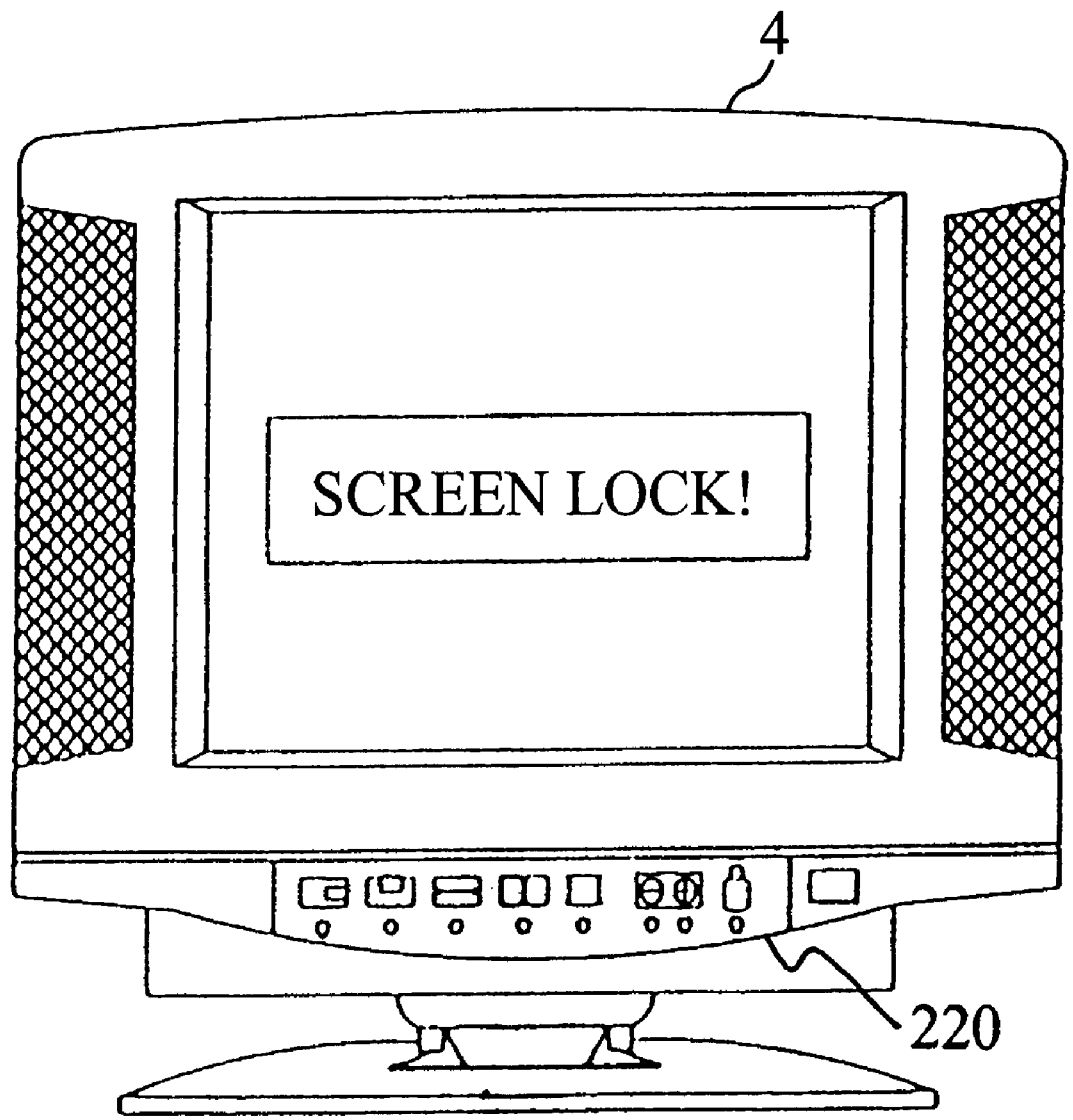
FIG. 7 is a schematic view of the display monitor illustrating execution of screen locking according to the principles of the present invention.

First of all, the user pushes the screen locking switch 227 on the control panel of the display monitor 200 at step S10. Here, the microcomputer 210 of the display monitor 200 confirms if a screen locking flag is set or not at step S20. When the screen locking switch is pushed while the screen locking flag is set, the microcomputer 210 of the display monitor 200 enables operation of information input devices such as a keyboard 2 and mouse 3 through the universal serial bus (USB) hub 10 at step S31. Then, the screen locking flag is reset at step S41. When the screen locking switch is pushed while the screen locking flag is not set, the microcomputer 210 of the display monitor 260 disables operation of the information input devices such as the keyboard 2 and mouse 3 at step S32. When the screen locking flag is set at step S42, OSD characters are displayed on the display monitor at step S50, as shown in FIG. 7, to inform the user that the screen locking has been carried out. Meantime, during execution of screen locking, the microcomputer 210 of the display monitor 200 outputs a control signal to realize the DPMS mode immediately. After setting of screen locking switch; transition from stand-by mode to suspend mode to power-off mode is performed with the lapse of time. Here, the operations of the information input devices such as the keyboard and mouse are controlled depending on whether the screen locking switch is set or not.

As described above, the present invention allows the user to control the keyboard and mouse in the computer system which can exchange information with them using the USB hub. Furthermore, when the user has to leave the system during execution of important program, the program can be prevented from being damaged by others.

While there have been illustrated and described what are considered to be preferred embodiments of the present invention, it will be understood by those skilled in the art that various changes and modifications may be made, and equivalents may be substituted for elements thereof without departing from the true scope of the screen locking function of a computer system using USB hub of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. In a computer system provided with a screen locking function, said system comprising:
   a computer main unit;
   at least one information input device electrically connected to said computer main unit for permitting a user to input information to said computer main unit for data processing operation; and
   a display device electrically connected to said computer main unit for providing a visual display of information processed by said computer main unit;
   the improvement comprising:
   positioned on said display device, integrated therewith and a unitary, fixedly attached portion thereof, a screen-lock on-off toggle; and
   operatively coupled to said toggle, a means for permitting the user to manually and temporarily disable operation of said at least one information input device at a user-determined time, independently of a screen-saver, and for causing a display to appear on said display device to indicate that the system has been set to a screen-lock state, said means thereby entirely preventing any user from inputting information to said computer main unit as long as said toggle is set to disable operation of said information input device.

2. The computer system of claim 1, further comprised of said screen locking apparatus corresponding to a switch which operates in a toggle mode for permitting the user to lock and unlock the screen while enabling and disabling operation of the information input device.

3. The computer system of claim 1, further comprised of said display device comprising an on-screen display circuit for providing a visual display of a setting state of the screen locking apparatus to inform the user of said setting state.

4. The computer system of claim 1, further comprising a universal serial bus (USB) hub arranged to electrically connect said information input devices and said display device to said computer main unit.

5. The computer system of claim 1, further comprised of said display device operating in a display power manage signaling (DPMS) mode to inform the user of the computer status in dependence upon operation of the screen locking apparatus.

6. A method of locking a computer system using a screen locking apparatus set on a display device, said method comprising the steps of:
   (1) providing a computer system comprising a display device on which is positioned a, screen-lock on-off toggle, said toggle integral with and a unitary, fixedly attached portion of said display device, said toggle operatively coupled to a means for permitting a user of the system to manually and temporarily disable operation of an information input device at a user-determined time, independently of a screen saver, said means thereby entirely preventing any user from inputting information to said computer main unit as long as said toggle is set to disable operation of said information input device;
   (2) switching the toggle between an on-position and an off-position, to send an electrical signal to said means;
   (3) confirming, in response to said signal, whether a screen locking flag is set;
   (4) enabling operation of an information input device electrically connected to the computer system, when the toggle is switched on while the screen locking flag is set; and
   (5) disabling operation of the information input device electrically connected to the computer system, when the screen locking apparatus is switched on but the screen locking flag is not set.

7. The method of claim 6, wherein said information input device is a keyboard or a mouse.

8. The method of claim 6, further comprising a step of resetting the screen locking flag after enabling operation of said information input devices.

9. The method of claim 6, further comprising a step of setting the screen locking flag after disabling operation of said information input devices.

10. The method of claim 9, further comprising a step of providing an on-screen display of characters indicating said screen locking function on said display device after the screen locking flag is set.

11. In a computer system, comprising:
    a computer main unit; and
    a universal serial bus (USB) hub electrical connected to said computer main unit serving as a central connection point for power and data distribution to at least one information input device and a display device;

the improvement comprising:

positioned on said display device, integral therewith and a unitary, fixedly attached portion thereof, a screen-lock on-off toggle; and operatively coupled to said toggle, a means for permitting the user to manually and temporarily disable operation of said at least one information input device at a user-determined time, independently of a screen-saver, and for causing a display to appear on said display device to indicate that the system has been set to a screen-lock state via said USB hub, said means thereby entirely preventing any user from inputting information to said computer main unit as long as said toggle is set to disable operation of said information input device.

12. The computer system of claim 11, further comprised of said toggle operating in a mode to permit the user to lock and unlock the screen while enabling and disabling operation of and at least one information input device.

13. The computer system of claim 11, further comprised of said display device comprising an on-screen display circuit for providing a visual display of a screen locking state of the toggle to inform the user of said screen locking state.

14. The computer system of claim 11, further comprised of said display device operating in a display power manage signaling (DPMS) mode to inform the user of the computer status in dependence upon operation of the toggle.

15. The computer system of claim 11, further comprised of said USB hub comprising:

an upstream port coupled to receive data and clock signals from the computer system;

a plurality of downstream ports for sending respective power control signals to said at least one information input device and the display device; and a USB controller disposed between the upstream port and the plurality of downstream ports to control mutual transmission of data between the display device and said at least one information input device.

16. The computer system of claim 15, further comprised of the power supplied from the universal serial bus hub corresponding to 5 volts.

* * * * *